Figure 1:
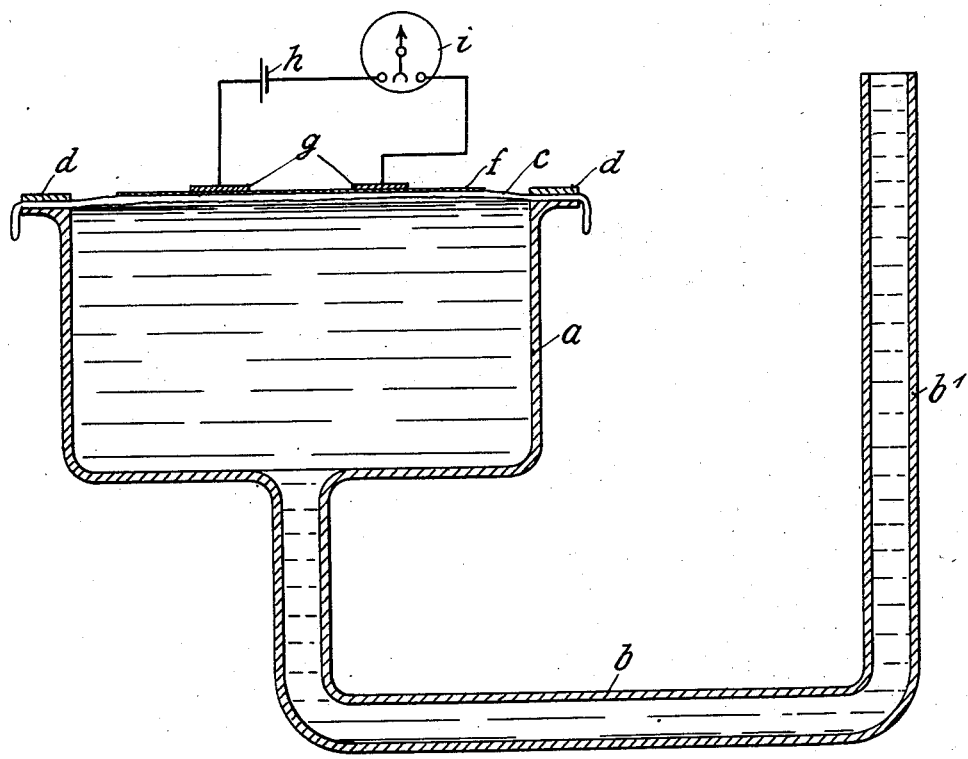

Aug. 27, 1935. R. KERN 2,012,762
METHOD OF AND SYSTEM FOR TESTING THE IMPERVIOUSNESS
TO WATER OF IMPREGNATED TEXTILES
Filed Aug. 7, 1933 2 Sheets-Sheet 1

Inventor:
R. Kern
By: Marks & Clerk
Attys.

Aug. 27, 1935.                    R. KERN                      2,012,762
       METHOD OF AND SYSTEM FOR TESTING THE IMPERVIOUSNESS
              TO WATER OF IMPREGNATED TEXTILES
                    Filed Aug. 7, 1933           2 Sheets-Sheet 2
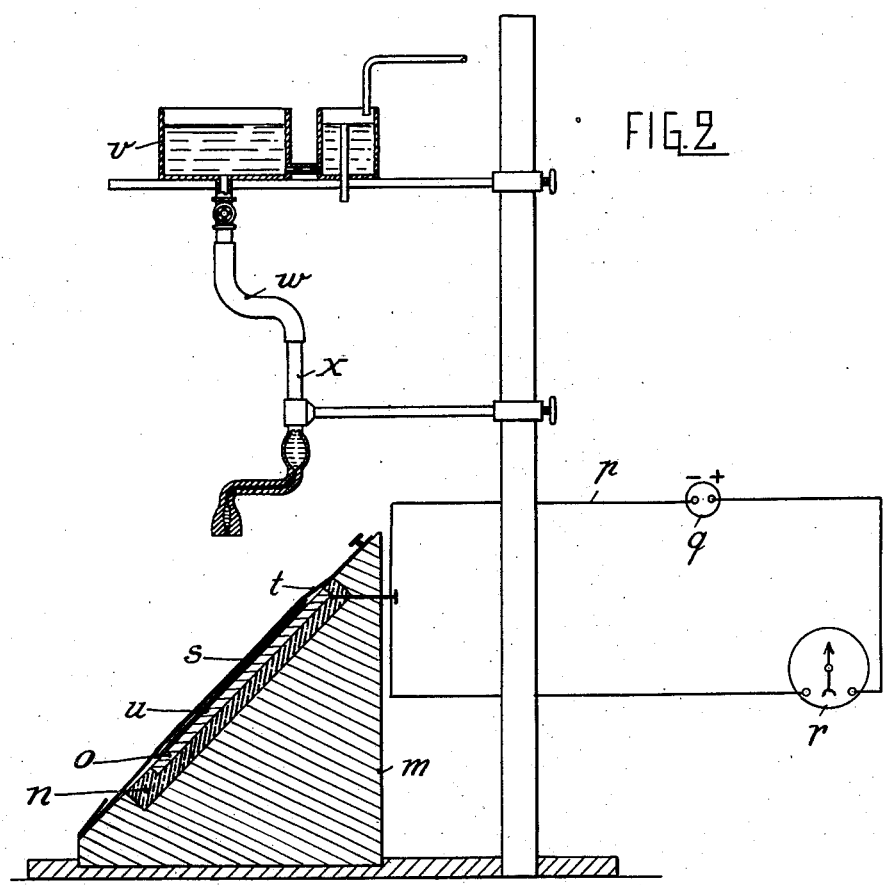
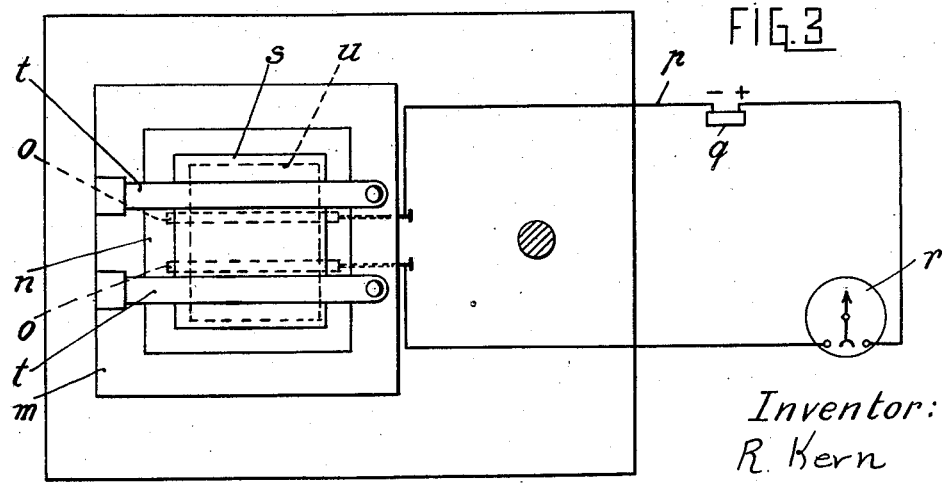
Inventor:
R. Kern
By: Marks & Clerk
      Attys.

Patented Aug. 27, 1935

2,012,762

UNITED STATES PATENT OFFICE 2,012,762

METHOD OF AND SYSTEM FOR TESTING THE IMPERVIOUSNESS TO WATER OF IMPREGNATED TEXTILES

Rudolf Kern, Oschatz, Germany, assignor to the firm Chemische Fabrik R. Baumheier Aktiengesellschaft, Zschollau near Oschatz, Saxony, Germany Application August 7, 1933, Serial No. 684,074 In Germany August 13, 1932

11 Claims. (Cl. 175—183)

My invention relates to improvements in the method of and system for testing the imperviousness to water of impregnated textiles, and the object of the improvements is to provide a method and a system by means of which the imperviousness of porous impregnated textiles may be rapidly and accurately measured in a quantitative way. With this object in view my invention consists in allowing a liquid to pass through the impregnated textile, and electrically determining the moment when the liquid has passed through the textile.

For the purpose of explaining the invention two examples embodying the same will be described hereafter, reference being had to the accompanying drawings, in which Fig. 1 is a diagrammatical sectional elevation showing an apparatus for measuring the imperviousness, Fig. 2 is a similar sectional elevation showing a modification, and Fig. 3 is a top plan view of Fig. 2.

In the example shown in Fig. 1 the apparatus comprises a container $a$ connected at its bottom with a U-shaped pipe $b$ having a branch $b'$ directed upwardly and extending above the top surface of the container $a$. The container $a$ and the pipe $b$ are filled with a suitable liquid, and the container $a$ is closed at its top by the fabric $c$ to be tested, the said fabric being held in position by means of a frame $d$. Thus the liquid within the container $a$ and the pipe $b$ exerts hydrostatic pressure on the bottom face of the fabric $a$. On the top side of the fabric there is a piece of filtering paper $f$ which before had been impregnated with a 5% solution of potassium nitrate and dried, and on the said filtering paper two laminations $g$ are placed with light pressure, which laminations are connected with a source of electric energy $h$ and a galvanometer $i$. The distance between the said laminations is $\frac{3}{8}$ inch.

After the fabric has thus been placed on the container $a$ the liquid such as water is filled into the same and into the pipe $b$ to a suitable level which may be determined by previous tests so that the desired hydrostatic pressure is exerted on the fabric. If desired the said pressure may be intermittently exerted within known periods of time, by intermittently raising and lowering the level of water within the pipe $b$ and the container $a$. Thus the water will gradually pass through the fabric and moisten the filtering paper $f$ within a certain period of time, whereupon the circuit of the source $h$, the galvanometer $i$ and the laminations $g$ is closed and the galvanometer is energized by electric current. The time required for allowing the water to pass through the textile is measured, and it indicates the imperviousness of the said textile.

It will be understood that the test is independent of subjective measuring of the imperviousness, and that most accurate objective results are obtained which require little attention of the attendant, and which give good results.

In Figs. 2 and 3 I have shown a system in which the action of the water on the impregnated textile corresponds more exactly to the conditions to which the textile is subjected in practical use. The method consists in allowing drops of water to fall on the fabric and electrically measuring the period of time or the number of drops required for permeating the textile.

The system comprises a table $m$ having its top face inclined at a suitable angle such as 45°. The said table is provided at its top with a plate $n$ of insulating material having two elongated electrodes $o$ embedded therein, which electrodes are connected by leads $p$ with a source of electric energy $q$ and a galvanometer $r$.

The textile $s$ to be tested is stretched on the table $m$ by means of cleats $t$, and below the textile a sheet $u$ of absorbing material such as filtering paper is placed which has been imbued with an electrolyte and dried, the said absorbing material being in contact with both electrodes $o$.

Above the table $m$ there is a receptacle $v$ in which a suitable liquid such as water is maintained at a constant level, and the said receptacle is connected at its bottom with a tube $w$ including a stactometer $x$ by means of which the water is made to fall in regulated drops on the textile $s$. The size of the whole apparatus is such that a fabric of say 4 square centimeters is needed for testing the imperviousness.

Before the test begins the circuit of the source $q$ and the galvanometer $r$ is interrupted between the electrodes $o$, because the dry sheet is nonconductive.

For testing the fabric regulated drops of water are made to fall thereon from the receptacle $v$. After the water has passed through the textile, the sheet $u$ of paper is moistened and made conductive, so that immediately the circuit of the galvanometer is closed and the galvanometer indicates that current flows through the circuit. The number of the drops falling on the textile or the period of time needed for moistening the paper indicate the imperviousness of the textile.

The height of fall of the drops may be adjusted according to the density and the character of the impregnation of the fabric to be tested, by moving the stactometer upwardly or downwardly.

I have found that ordinarily seven tests are sufficient for obtaining exact results. The degree of the imperviousness is indicated by the number of the drops which are uniform in volume and kinetic energy. But from the result of the test any kinetic factor may be determined by calculation, for example the impregnation imparted to the fabric may be determined as a function of the sum of the kinetic energies of the drops falling on the textile per surface area acted upon by the drops, the said surface area being equal to the largest sectional surface area of a drop of spherical form.

In one test I have found that for passing the liquid through a cotton fabric of 100 square centimeters impregnated with a certain impregnating medium described in my copending application for patent Ser. No. 555,148 filed Aug. 4, 1931 requires a kinetic energy of 0,421 mkg. Thus definitions are obtained which heretofore could not be obtained, for example the dependence of the impregnation of pH-value of the impregnating liquid, of the degree of the distribution of the disperse phase, of the electricity of the air, the humidity of the air, the drying temperature, additional sizing etc.

As an example the following figures illustrate the method:

Fabric: Cotton fabric having linen-weft.
Height of fall: 40 centimeters.
Stactometer: 20,2 drops of water at 20°.

| | Drops |
|---|---|
| Untreated fabric | 2 |
| Impregnated by a one-bath method common in the art | 4 |
| Impregnated by a two-bath method common in the art | 16 |
| Impregnated with a 2,5% solution of an impregnating paste of the trade | 26 |
| Impregnated with a 2,5% solution of my aforesaid impregnating medium | 60 |

While in describing the invention reference has been made to particular examples embodying the same I wish it to be understood that my invention is not limited to the examples described herein. For example in lieu of the galvanometer shown in the figures an acoustic or luminous signal may be used. Further, in lieu of the electrolytic paper and water a diluted electrolytic solution may be used for moistening the fabric, which solution has the same surface tension as pure water. In this case the circuit may be closed by the textile fabric which is impregnated with the said solution.

I claim:

1. The herein described method of ascertaining the imperviousness to liquids of porous impregnated textiles, which consists in causing a non-conductive liquid to pass through the textile in a controlled degree, and causing the said liquid to moisten a dry porous carrier containing an electrolytically responsive salt and forming a part of an electric measuring circuit.

2. The herein described method of ascertaining the imperviousness to liquids of porous impregnated textiles, which consists in causing controlled drops of a liquid to fall on the said textile, and electrically determining the moment when the liquid has passed through the textile.

3. The herein described system for measuring the imperviousness to liquids of impregnated textiles, comprising an open receptacle for a suitable liquid, means for stretching a textile across the opening of said receptacle, and an open electric measuring circuit located in position for being closed by the liquid passing from said receptacle through said textile.

4. The herein described system for measuring the imperviousness to liquids of impregnated textiles, comprising an open receptacle connected with an upwardly directed pipe extending to a level higher than the level of the opening of the receptacle, means for stretching a textile to be measured across said opening, and an open electric measuring circuit in position for being closed by the liquid passing from said receptacle through said textile.

5. A system as claimed in claim 3, in which the measuring circuit includes a sheet of dry porous material impregnated with an electrically active salt and located in position for being moistened by the liquid passing from said receptacle through the textile.

6. The herein described system for measuring the imperviousness to liquids of impregnated textiles, comprising a support for the textile to be measured, means for stretching the textile on said support, means for causing controlled drops to fall on said textile, and an open electric measuring circuit located in position for being closed by the liquid dropping on the textile and passing through the textile.

7. A system as claimed in claim 6, in which the electric circuit includes a dry sheet of porous material impregnated with an electrolytically active salt and located in position for being moistened by the liquid dropping on the textile and passing through the same.

8. The herein described method of ascertaining the imperviousness to liquids of porous impregnated textiles which consists in causing a liquid to flow along one side of the textile, the portion of the liquid passing through the textile closing an electric measuring circuit on the side of the textile opposite to said flowing liquid.

9. The herein described method of ascertaining the imperviousness to liquids of porous impregnated textiles, which consists in causing an electrically conductive liquid to pass through the textile from one side only, the moment when the liquid has passed through the textile being indicated electrically by the closing of a circuit on the opposite side of the textile.

10. The herein described method of ascertaining the imperviousness to liquids of porous impregnated textiles, which consists in causing a liquid to act by hydrostatic pressure on one side of the textile, and indicating the passage of the liquid through the textile by the closing of a circuit on the opposite side of the textile.

11. The herein described method for measuring the imperviousness to liquids of impregnated textiles, comprising holding the textile in stretched position, applying a suitable liquid on one side only of the textile, the liquid passing through the textile causing the closing of an electric circuit on the opposite side of the textile to that on which said liquid is applied.

RUDOLF KERN.